(12) United States Patent
Baladhandapani et al.

(10) Patent No.: US 12,548,453 B2
(45) Date of Patent: Feb. 10, 2026

(54) SYSTEMS AND METHODS FOR CONTEXT BASED OPTIMAL DATA EXCHANGE BROKER IN A CONNECTED ENVIRONMENT

(71) Applicant: Honeywell International Inc., Charlotte, NC (US)

(72) Inventors: Gobinathan Baladhandapani, Madurai (IN); Sivakumar Kanagarajan, Bangalore (IN); Anand Kutuva, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 363 days.

(21) Appl. No.: 18/065,836

(22) Filed: Dec. 14, 2022

(65) Prior Publication Data

US 2024/0135825 A1 Apr. 25, 2024
US 2024/0233551 A9 Jul. 11, 2024

(30) Foreign Application Priority Data

Oct. 25, 2022 (IN) .............................. 202211060753

(51) Int. Cl.
*G08G 5/25* (2025.01)
*B64D 45/00* (2006.01)
*G06F 16/242* (2019.01)
*G06F 16/2457* (2019.01)

(52) U.S. Cl.
CPC ............... *G08G 5/25* (2025.01); *B64D 45/00* (2013.01); *G06F 16/242* (2019.01); *G06F 16/24575* (2019.01)

(58) Field of Classification Search
CPC ................................ G08G 5/25; G06F 16/242
See application file for complete search history.

(56) References Cited

U.S. PATENT DOCUMENTS

| | | | |
|---|---|---|---|
| 2016/0034305 A1* | 2/2016 | Shear | G06F 9/50 707/722 |
| 2018/0322775 A1* | 11/2018 | Chase | G05D 1/226 |
| 2019/0147670 A1* | 5/2019 | Chopra | G07C 5/0808 701/29.1 |

* cited by examiner

*Primary Examiner* — Van H Oberly
(74) *Attorney, Agent, or Firm* — ALSTON & BIRD LLP (57) ABSTRACT

A system for context-based data exchange, the system comprising: a context-based querying model to generate a query based on an optimized context of a first vehicle, and to identify a second vehicle to receive the generated query and provide a response to the received query; an adaptive context optimizer to receive a transit phase of the first vehicle and provide the optimized context based on the received transit phase; and a service provider to identify the transit phase of the first vehicle, provide the identified transit phase to the adaptive context optimizer, receive the optimized context from the adaptive context optimizer, send the optimized context to the context-based querying model, and receive the generated query and identified second vehicle from the context-based querying model.

17 Claims, 5 Drawing Sheets

SYSTEMS AND METHODS FOR CONTEXT BASED OPTIMAL DATA EXCHANGE BROKER IN A CONNECTED ENVIRONMENT

CROSS-REFERENCE TO RELATED APPLICATION(S)

This application claims the benefit of priority to Indian Patent Application No. 202211060753, filed Oct. 25, 2022, the entirety of which is incorporated by reference herein.

TECHNICAL FIELD

Various embodiments of the present disclosure relate generally to systems and methods for context-based optimal data exchange broker in a connected environment.

BACKGROUND

Vehicles, such as unmanned aircraft and piloted aircraft, in a data-connected environment operate in dynamic environments throughout a flight that may lead to real-time variation in parameters from initial estimated parameters. The dynamic environments may include an increased number of flights in a short time span, a restricted airspace, and a route change, for example. Due to the real-time variation in parameters, vehicles may have reduced operational efficiency.

The present disclosure is directed to overcoming one or more of these above-referenced challenges.

SUMMARY OF THE DISCLOSURE

In some aspects, the techniques described herein relate to a system for context-based data exchange, the system including: a context-based querying model to generate a query based on an optimized context of a first vehicle, and to identify a second vehicle to receive the generated query and provide a response to the received query; an adaptive context optimizer to receive a transit phase of the first vehicle and provide the optimized context based on the received transit phase; and a service provider to identify the transit phase of the first vehicle, provide the identified transit phase to the adaptive context optimizer, receive the optimized context from the adaptive context optimizer, send the optimized context to the context-based querying model, and receive the generated query and identified second vehicle from the context-based querying model.

In some aspects, the techniques described herein relate to a system, wherein the adaptive context optimizer is further configured to provide the optimized context by prioritizing context that produces influential results when queried, and de-prioritizing context that does not produce influential results.

In some aspects, the techniques described herein relate to a system, wherein the context-based querying model is further configured to identify the second vehicle among a plurality of vehicles, based on (i) a recent activity of the second vehicle occurring within a threshold time of the transit phase of the first vehicle, and (ii) the recent activity of the second vehicle being similar to the transit phase of the first vehicle.

In some aspects, the techniques described herein relate to a system, wherein the first vehicle is an aircraft, and the transit phase of the first vehicle is a phase of a flight of the aircraft.

In some aspects, the techniques described herein relate to a system, wherein the phase of the flight of the aircraft is a pre-flight taxi, takeoff, climb, cruise, descent, approach, landing, or post-flight taxi.

In some aspects, the techniques described herein relate to a system, wherein the context-based querying model is further configured to generate the query to include a request to the second vehicle for context including one or more of landing data, runway data during touch down, wind during approach, air temperature and turbulence at a given altitude, surface wind, tail wind, or flight level data, when the phase of the flight of the aircraft is landing.

In some aspects, the techniques described herein relate to a system, wherein the context-based querying model is further configured to identify a last aircraft to land at a destination of the first vehicle, as the second vehicle, when the phase of the flight of the aircraft is landing.

In some aspects, the techniques described herein relate to a system, wherein the service provider is further configured to receive the generated query and identified second vehicle from the context-based querying model, send the generated query to the second vehicle, receive the response from the second vehicle, provide the response to the first vehicle, and determine the influential results based on an interaction of a user with the provided response.

In some aspects, the techniques described herein relate to a controller-implemented method for context-based data exchange, the method including: identifying a transit phase of a first vehicle; providing an optimized context of the first vehicle based on the identified transit phase; generating a query based on the optimized context of the first vehicle; and identifying a second vehicle to receive the generated query and provide a response to the received query.

In some aspects, the techniques described herein relate to a method, wherein the providing the optimized context includes prioritizing context that produces influential results when queried and de-prioritizing context that does not produce influential results.

In some aspects, the techniques described herein relate to a method, wherein the identifying the second vehicle includes identifying the second vehicle among a plurality of vehicles, based on (i) a recent activity of the second vehicle occurring within a threshold time of the transit phase of the first vehicle, and (ii) the recent activity of the second vehicle being similar to the transit phase of the first vehicle.

In some aspects, the techniques described herein relate to a method, wherein the first vehicle is an aircraft, and the transit phase of the first vehicle is a phase of a flight of the aircraft.

In some aspects, the techniques described herein relate to a method, wherein the phase of the flight of the aircraft is a pre-flight taxi, takeoff, climb, cruise, descent, approach, landing, or post-flight taxi.

In some aspects, the techniques described herein relate to a method, wherein when the phase of the flight of the aircraft is landing, the generating the query includes generating a request to the second vehicle for context including one or more of landing data, runway data during touch down, wind during approach, air temperature and turbulence at a given altitude, surface wind, tail wind, or flight level data.

In some aspects, the techniques described herein relate to a method, wherein when the phase of the flight of the aircraft is landing, the identifying the second vehicle includes identifying a last aircraft to land at a destination of the first vehicle, as the second vehicle.

In some aspects, the techniques described herein relate to a method, further including: sending the generated query to the second vehicle; receiving the response from the second vehicle; providing the response to the first vehicle; and determining the influential results based on an interaction of a user with the provided response.

In some aspects, the techniques described herein relate to a non-transitory computer-readable medium storing instructions that, when executed by one or more processors, cause the one or more processors to perform operations for context-based data exchange, the operations including: identifying a transit phase of a first vehicle; providing an optimized context of the first vehicle based on the identified transit phase; generating a query based on the optimized context of the first vehicle; and identifying a second vehicle to receive the generated query and provide a response to the received query.

In some aspects, the techniques described herein relate to a computer-readable medium, wherein the providing the optimized context includes prioritizing context that produces influential results when queried and de-prioritizing context that does not produce influential results.

In some aspects, the techniques described herein relate to a computer-readable medium, wherein the identifying the second vehicle includes identifying the second vehicle among a plurality of vehicles, based on (i) a recent activity of the second vehicle occurring within a threshold time of the transit phase of the first vehicle, and (ii) the recent activity of the second vehicle being similar to the transit phase of the first vehicle.

In some aspects, the techniques described herein relate to a computer-readable medium, wherein the operations further include: sending the generated query to the second vehicle; receiving the response from the second vehicle; providing the response to the first vehicle; and determining the influential results based on an interaction of a user with the provided response.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to systems and methods for context-based optimal data exchange broker in a connected environment.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Vehicles, such as unmanned aircraft and piloted aircraft, in a data-connected environment may operate in dynamic environments throughout a flight that may lead to real-time variation in parameters from initial estimated parameters. The dynamic environments may include an increased number of flights in a short time span, a restricted airspace, and a route change, for example. Due to the real-time variation in parameters, vehicles may have reduced operational efficiency. To avoid reduced operational efficiency, vehicles should adapt in real time by retrieving information based on context from other vehicles in the data-connected environment.

Various embodiments of the present disclosure may continuously monitor for a predefined set of scenarios in order to identify the best course of action and parameters to optimize the predicted flight pattern. For example, the scenarios may be an operation state of a vehicle, such as a transit phase. Various embodiments of the present disclosure may use contextual querying from multiple flying vehicles in order to obtain environment and airspace data that are likely to be encountered by the current vehicle. Various embodiments of the present disclosure may improve exploitation of the connected framework. Various embodiments of the present disclosure may mitigate loss of fuel, reduced performance, and untimely maintenance setbacks, and may improve passenger experience.

As time and space are the key constraints in mobile flights, there arises a need for dynamic assessment of estimations along with reducing the ambiguity in data processing. Various embodiments of the present disclosure may address the above by placing emphasis on contextual importance along with adaptation and refinement. Various embodiments of the present disclosure may provide core aspects of adaptation and dynamic knowledge of the environment. Various embodiments of the present disclosure may prevent the requirement to follow repetitive processes of static data analysis. Various embodiments of the present disclosure may use the benefits associated with each context to determine a need for the context for queries. This type of intelligence in data retrieval and processing works in an adaptive way based on surroundings and localization. Various embodiments of the present disclosure may use machine learning and artificial intelligence provide consumers with trusted, seamless, and personalized services.

Various embodiments of the present disclosure may provide individual distributed components for increased processing capability and productivity during query construction and context evaluation. Various embodiments of the present disclosure may provide selective intelligence to prevent unnecessary data overload. Various embodiments of the present disclosure may provide adaptability based on query-yield to optimize contexts. Various embodiments of the present disclosure may prevent a static and ambiguous estimation process to achieve efficiency.

Some factors which may play a crucial role in flights are local weather, air traffic, destination, and passenger delays, for example. Based on the prevailing situation, querying may be performed for data pertaining to the above factors. For example, in a landing phase, querying may be performed to retrieve context such as landing data, runway data during touch down, wind during approach, air temperature and turbulence at a given altitude, surface wind, tail wind, and flight level data.

Various embodiments of the present disclosure may exhibit competence in a selective intelligence feature, wherein data obtained during each flight is not used for refining future flight plans but the contextual knowledge leading to queries is improved. As margin for errors is less, the overburden of data for autonomous learning to predict dynamic flight plans is reduced. Various embodiments of the present disclosure may optimize queries that provide useful data at any given point of space and time in a connected airspace. Hence, various embodiments of the present disclosure may provide a system that knows when to query and what to query, and may adapt based on one or more of the results of the query or an operator interaction with the results.

Various embodiments of the present disclosure may include a Context-based Querying Model and an Adaptive Context Optimizer. Various embodiments of the present disclosure may also include a Service Provider that may interface with the Context-based Querying Model and an Adaptive Context Optimizer, and may further integrate the system into a large-scale data platform with optimized data from many individual systems.

The Context-based Querying Model may be responsible for carrying out query formation and finding appropriate vehicles in order to receive knowledge of what can be expected in the immediate future in shared localities. Domestic flight regions present dynamic conditions pertaining to localized environmental and social settings, especially at the lower altitudes traversed by vehicles such as Urban Air Mobility (UAM) vehicles or Search and Rescue (SAR) aircraft. Moreover, predicted flight plans during pre-flight estimates may often get re-shaped due to the ad-hoc nature of the domain. The Context-based Querying Model may construct queries to be executed for a specific set of entities that play a role in defining certain flight operations at determined timestamps based on contextual knowledge. In the connected airspace, the Context-based Querying Model may identify aircraft that had followed identical flight patterns, and build queries for selective data, such as the landing context data described above. Once the retrieval has happened, a current flight plan is forecast against the expected conditions and refined to yield best results. The Context-based Querying Model may minimize necessary memory, as the model performs communication based on contextual knowledge with variable query results.

The Adaptive Context Optimizer may be used to derive ideal context. The Adaptive Context Optimizer may have a memory element, and represents context as knowledge. The Adaptive Context Optimizer may deploy selective intelligence wherein data obtained as a result of querying is expunged after forecasting and refinement, and subsequently the model is improved based only on the merits of the data. Hence, there is no need to learn flight plans and add additional overhead during pre-flight estimation. The Adaptive Context Optimizer may adapt over multiple flights to prioritize context that produces influential results when queried, and de-prioritize context that does not produce influential results. This intelligent identification may lead to optimized queries that are used by the Context-based Querying Model. With each successive flight, the system may further adapt to a region in which the system is used, by working in tandem with multiple aircraft deployed in accessible vicinities with selective intelligence to improve passenger experience by fully leveraging the data-connected environment.

The following examples may provide relationships in the Context-based Querying Model between contextual data and a vehicle to query to receive pertinent data. Below, the context is described with reference to when the Context-based Querying Model determines the transit phase as a landing operation, for example. However, the disclosure is not limited thereto, and other scenarios and contexts, such as taxi or takeoff operations, for example, may be included in the Context-based Querying Model.

When the Context-based Querying Model indicates contextual data of a runway wind condition may provide pertinent data, the model may generate a query to an aircraft that was the last to land on the runway. When the Context-based Querying Model indicates contextual data of atmospheric pressure at mean sea level (QNH) may provide pertinent data, the model may generate a query to an aircraft that was the last to take-off or land at the airport. When the Context-based Querying Model indicates contextual data of ground traffic may provide pertinent data, the model may generate a query to an aircraft that was the last to cross the waypoint of interest. When the Context-based Querying Model indicates gate availability may provide pertinent data, the model may generate a query to aircraft that were among the last to taxi to or from gates. When the Context-based Querying Model indicates an altitude may provide pertinent data, the model may generate a query to aircraft that are flying at or approaching the altitude. When the Context-based Querying Model indicates a speed may provide pertinent data, the model may generate a query to leading or trailing aircraft. The above-described relationships may provide representative examples of those in the Context-based Querying Model. However, the disclosure is not limited thereto. Various embodiments of the present disclosure may also a Service Provider that may integrate the system into a large-scale data platform with optimized data from many individual systems. In the a large-scale data platform, one or more of the above-described relationships may be shared by the Service Provider with the large-scale data platform, and available through the large-scale data platform to another Service Provider.

In a connected environment, all vehicles may communicate with each other for information exchange and monitoring. During a flight, the system may monitor the present context of a vehicle at regular time intervals in order to determine another ideal vehicle to yield efficiency upon querying and refinement of operations. For example, the Context-based Querying Model may contain data among which weather, braking efficiency, and traffic are primarily focused. When the flight reaches a landing segment, for example, the Adaptive Context Optimizer may identify the specific set of vehicles in the vicinity of the connected infrastructure. Among the identified vehicles, the most suitable vehicle is selected, based on the recent activities using a timestamp and similarity in operations. For example, for a landing operation, the Adaptive Context Optimizer may select a vehicle that has most recently landed nearest to the destination of the current vehicle. The Adaptive Context Optimizer may have a smart feature to eliminate certain criteria during query formation. For example, the braking efficiency depends on vehicle properties and a destination surface, which are generally static in nature, whereas the weather plays a much more important role in determining landing efficiency. The weather may include locale-based tail winds and air pressure, for example. Thus, the system may ignore aircraft that present the least capacity to provide locale-based tail winds and air pressure. The system may frame a query to retrieve the weather data from one or more vehicles that present the greatest capacity to provide pertinent information and communicate with the one or more vehicles to obtain the data. After the data has been obtained as a result of the query, the system may estimate a new forecast, and adjust pre-defined operation parameters to gain maximum optimization. The Adaptive Context Optimizer may analyze the action-response sequence (i.e. contextual query—benefit from result) to assess a priority of the context and store the analysis in memory for future use.

Figure 1:
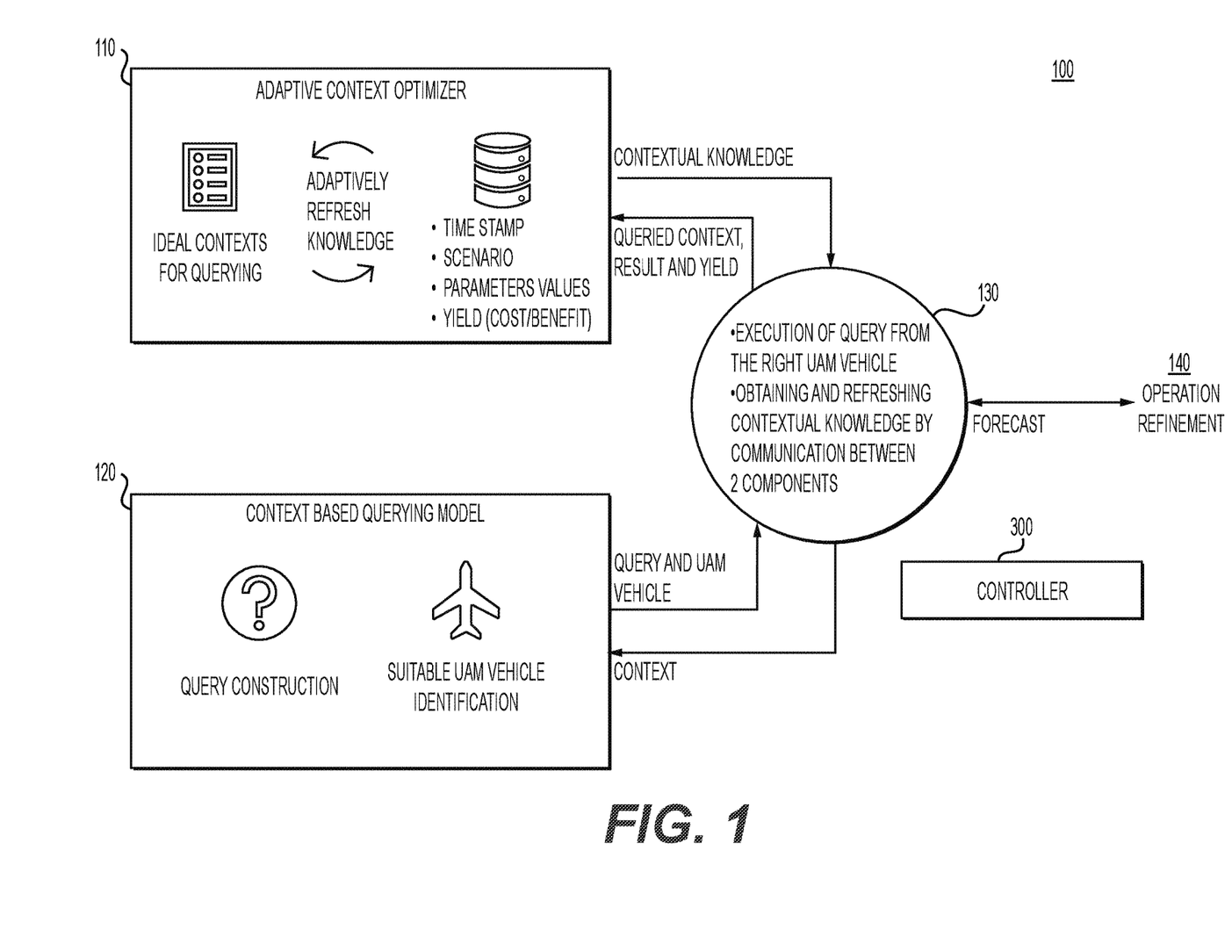
FIG. 1 depicts an exemplary system infrastructure for a context-based optimal data exchange broker, according to one or more embodiments.

FIG. 1 depicts an exemplary system infrastructure for a context-based optimal data exchange broker, according to one or more embodiments. As shown in FIG. 1, system 100 may include Adaptive Context Optimizer 110, Context-based Querying Model 120, Service Provider 130, Operation Refinement 140, and controller 300.

Context-based Querying Model 120 may generate a query based on an optimized context of a first vehicle, and identify a second vehicle to receive the generated query and provide a response to the received query. Adaptive Context Optimizer 110 may receive a transit phase of the first vehicle and provide the optimized context based on the received transit phase. For example, the first vehicle may be an aircraft, and the transit phase of the first vehicle may be a phase of a flight of the aircraft. The phase of the flight of the aircraft may be a pre-flight taxi, takeoff, climb, cruise, descent, approach, landing, or post-flight taxi. Service Provider 130 may identify the transit phase of the first vehicle, provide the identified transit phase to Adaptive Context Optimizer 110, receive the optimized context from Adaptive Context Optimizer 110, send the optimized context to Context-based Querying Model 120, and receive the generated query and identified second vehicle from Context-based Querying Model 120.

Adaptive Context Optimizer 110 may provide the optimized context by prioritizing context that produces influential results when queried, and de-prioritizing context that does not produce influential results. Context-based Querying Model 120 may be configured to identify the second vehicle among a plurality of vehicles, based on (i) a recent activity of the second vehicle occurring within a threshold time of the transit phase of the first vehicle, and (ii) the recent activity of the second vehicle being similar to the transit phase of the first vehicle.

Context-based Querying Model 120 may be further configured to generate the query to include a request to the second vehicle for context including one or more of landing data, runway data during touch down, wind during approach, air temperature and turbulence at a given altitude, surface wind, tail wind, or flight level data, when the phase of the flight of the aircraft is landing. Context-based Querying Model 120 may be further configured to identify a last aircraft to land at a destination of the first vehicle, as the second vehicle, when the phase of the flight of the aircraft is landing. Service Provider 130 may be further configured to receive the generated query and identified second vehicle from Context-based Querying Model 120, send the generated query to the second vehicle, receive the response from the second vehicle, provide the response to the first vehicle, and determine the influential results based on an interaction of a user with the provided response.

Adaptive Context Optimizer 110 may be used to derive ideal context. The Adaptive Context Optimizer may have a memory element, and represents context as knowledge. Adaptive Context Optimizer 110 may deploy selective intelligence wherein data obtained as a result of querying is expunged after forecasting and refinement, and subsequently the model is improved based only on the merits of the data. Hence, there is no need to learn flight plans and add additional overhead during pre-flight estimation. Adaptive Context Optimizer 110 may adapt over multiple flights to prioritize context that produces influential results when queried, and de-prioritize context that does not produce influential results. This intelligent identification may lead to optimized queries that are used by the Context-based Querying Model 120. With each successive flight, the system may further adapt to a region in which the system is used, by working in tandem with multiple aircraft deployed in accessible vicinities with selective intelligence to improve passenger experience by fully leveraging the data-connected environment.

Context-based Querying Model 120 may be responsible for carrying out query formation and finding appropriate vehicles in order to receive knowledge of what can be expected in the immediate future in shared localities. Domestic flight regions present dynamic conditions pertaining to localized environmental and social settings, especially at the lower altitudes traversed by vehicles such as Urban Air Mobility (UAM) vehicles or Search and Rescue (SAR) aircraft. Moreover, predicted flight plans during pre-flight estimates may often get re-shaped due to the ad-hoc nature of the domain. Context-based Querying Model 120 may construct queries to be executed for a specific set of entities that play a role in defining certain flight operations at determined timestamps based on contextual knowledge. In the connected airspace, Context-based Querying Model 120 may identify aircraft that had followed identical flight patterns, and build queries for selective data, such as the landing context data described above. Once the retrieval has happened, a current flight plan is forecast against the expected conditions and refined to yield best results. Context-based Querying Model 120 may minimize necessary memory, as the model performs communication based on contextual knowledge with variable query results.

Service Provider 130 may interface with Context-based Querying Model 120 and Adaptive Context Optimizer 110, and may further integrate the system into a large-scale data platform with data collected from many individual systems. Operation Refinement 140 may provide feedback to Service Provider 130 from a user or operator of the vehicle indicating what information is most valuable or influential to the user or operator. This feedback may be provided by Service Provider 130 to Adaptive Context Optimizer 110 to optimize context. Controller 300 may control the operations of Adaptive Context Optimizer 110, Context-based Querying Model 120, Service Provider 130, and Operation Refinement 140. Controller 300 is further described below.

Figure 2:
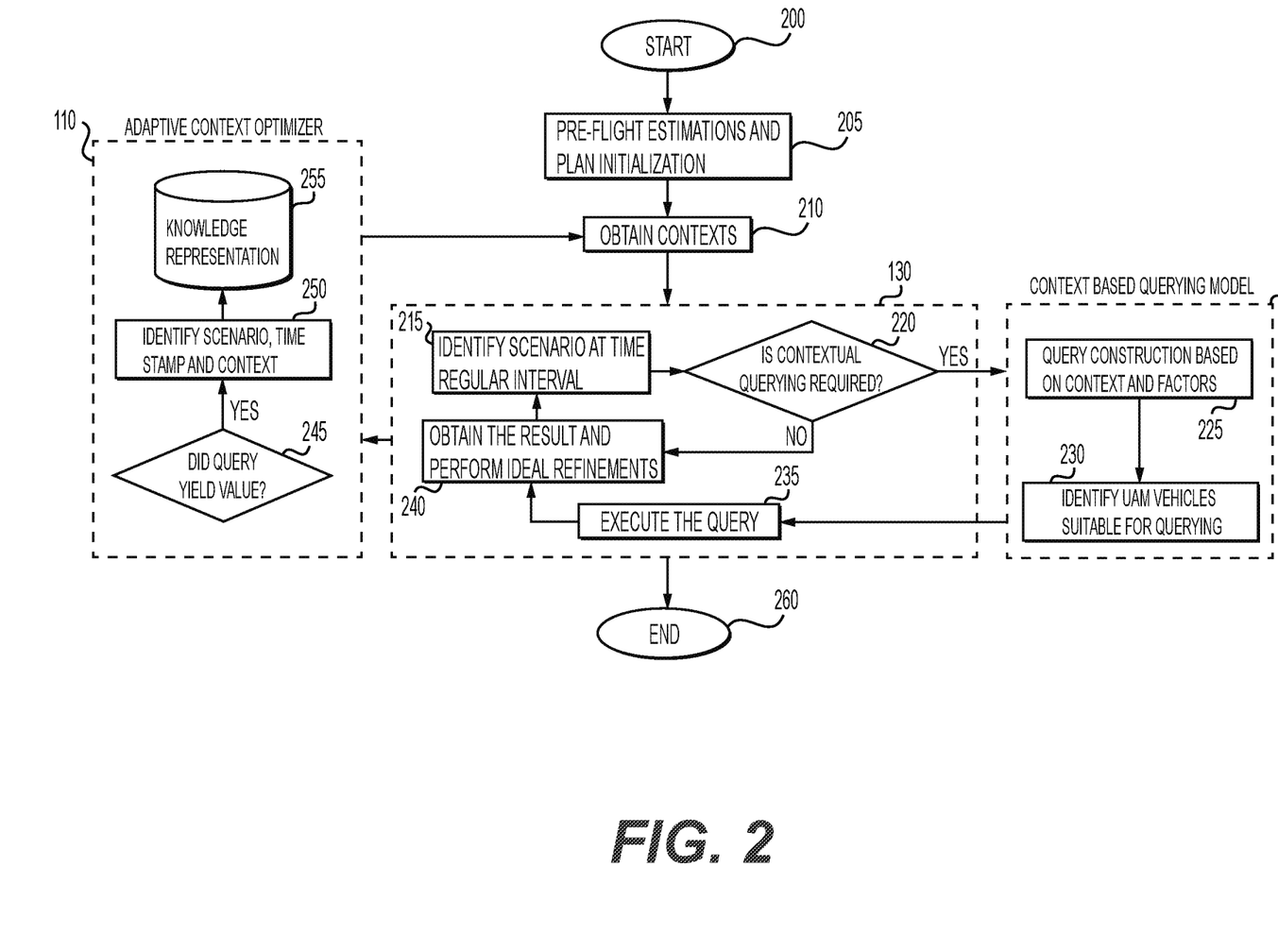
FIG. 2 depicts an operational flowchart of a context-based optimal data exchange broker, according to one or more embodiments.

FIG. 2 depicts an operational flowchart of a context-based optimal data exchange broker, according to one or more embodiments. As shown in FIG. 2, system 100, including controller 300, may perform various operations to provide optimal data. Operation 200 may be a starting reference and operation 260 may be an ending reference for the various operations. In operation 205, system 100 may use pre-flight estimations to generate an initial flight plan. In operation 210, system 100 may obtain one or more contexts from Adaptive Context Optimizer 110. In operation 215, Service Provider 130 may identify context at regular time intervals. In operation 220, Service Provider 130 may determine whether a contextual query is required based on the identified context. When a contextual query is required as determined in operation 220, in operation 225, Context-based Querying Model 120 may construct a query based on the context. Context-based Querying Model 120 may identify one or more other vehicles that are suitable for querying in operation 230. In operation 235, Service Provider 130 may execute the constructed query. Service Provider 130 may obtain the result of the query and refine the result in operation 240. Operation 240 may also be performed when a contextual query is not required as determined in operation 220. In operation 245, Adaptive Context Optimizer 110 may determine whether the query returned results that provided influential value to an operator of the vehicle. As described above, Adaptive Context Optimizer 110 may determine the influential results based on an interaction of a user with the provided response. In operation 250, Adaptive Context Optimizer 110 may identify a context and time-stamp. Adaptive Context Optimizer 110 may use the determinations and identifications to update a knowledge representation database in operation 255.

Figure 3:
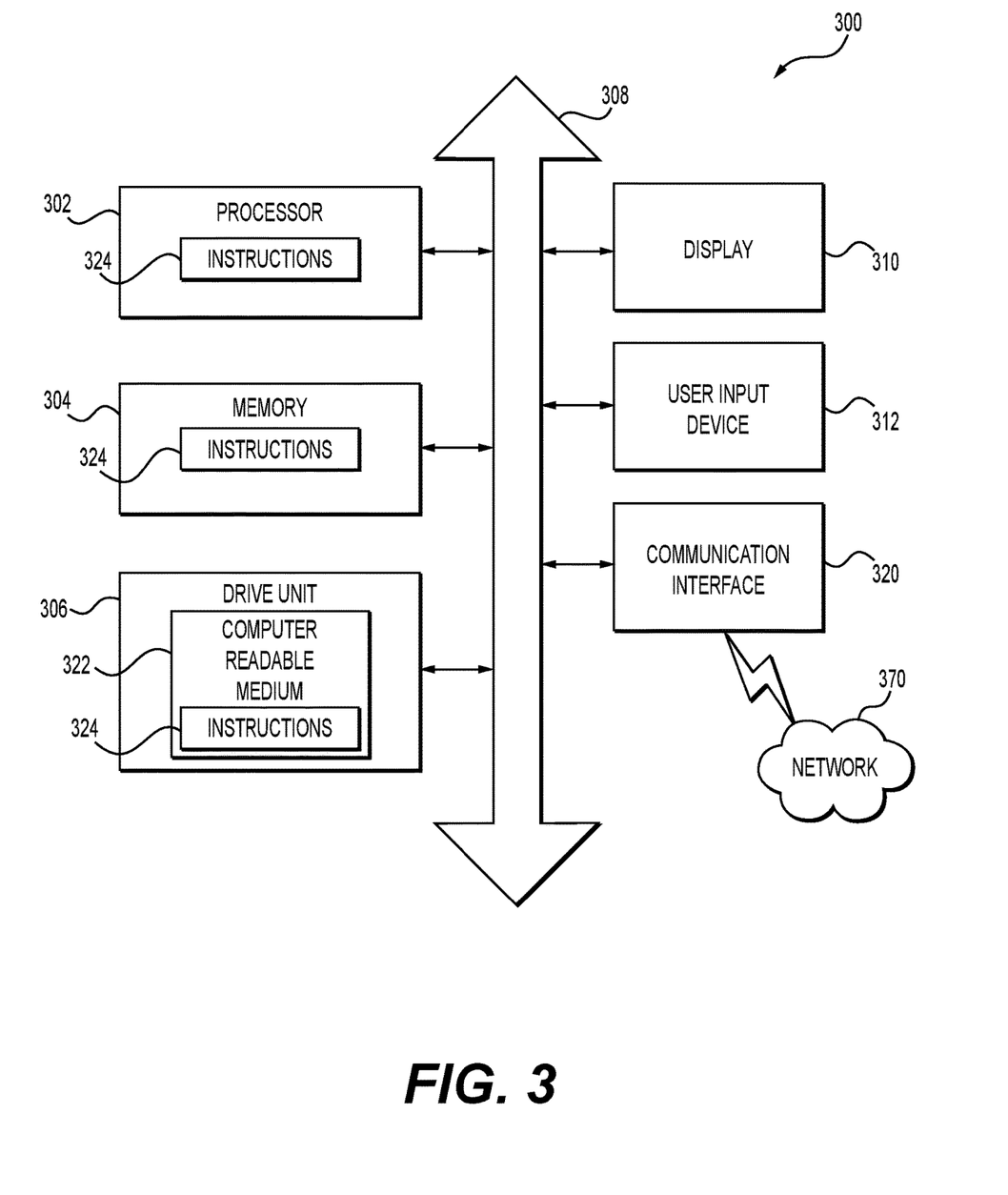
FIG. 3 depicts an implementation of a controller that may execute techniques presented herein, according to one or more embodiments.

FIG. 3 depicts an implementation of a controller 300 that may execute techniques presented herein, according to one or more embodiments. The controller 300 may include a set of instructions that can be executed to cause the controller 300 to perform any one or more of the methods or computer based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
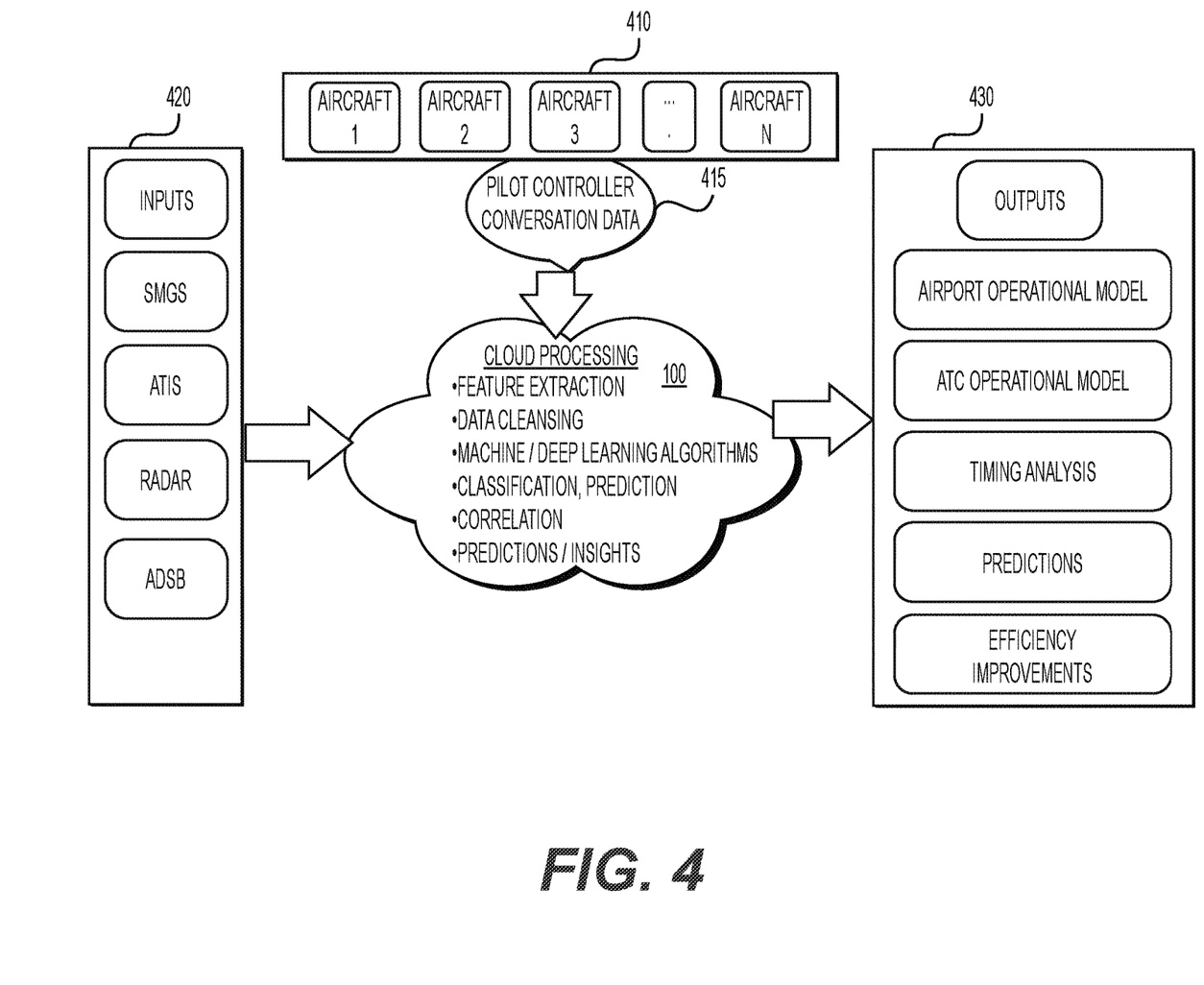
FIG. 4 depicts a context-based optimal data exchange broker in a connected environment, according to one or more embodiments.

FIG. 4 depicts a context-based optimal data exchange broker in a connected environment, according to one or more embodiments. As shown in FIG. 4, system 100 may receive vehicle data 410 from one or more vehicles. The vehicle data may include conversation data 415 between pilots and controllers. System 100 may receive source data 420 from other sources, such as data from sources such as a Surface Movement Guidance and Control System (SMGCS), Automatic Terminal Information Service (ATIS), radar, or Automatic Dependent Surveillance—Broadcast (ADS-B), for example. System 100 may process the vehicle data 410 and source data 420, and provide output data 430 to optimize an operation of a vehicle. Output data 430 may include data such as an airport operational model, air traffic controller operational model, timing analysis, predictions, and suggestions for efficiency improvements, for example.

Figure 5:
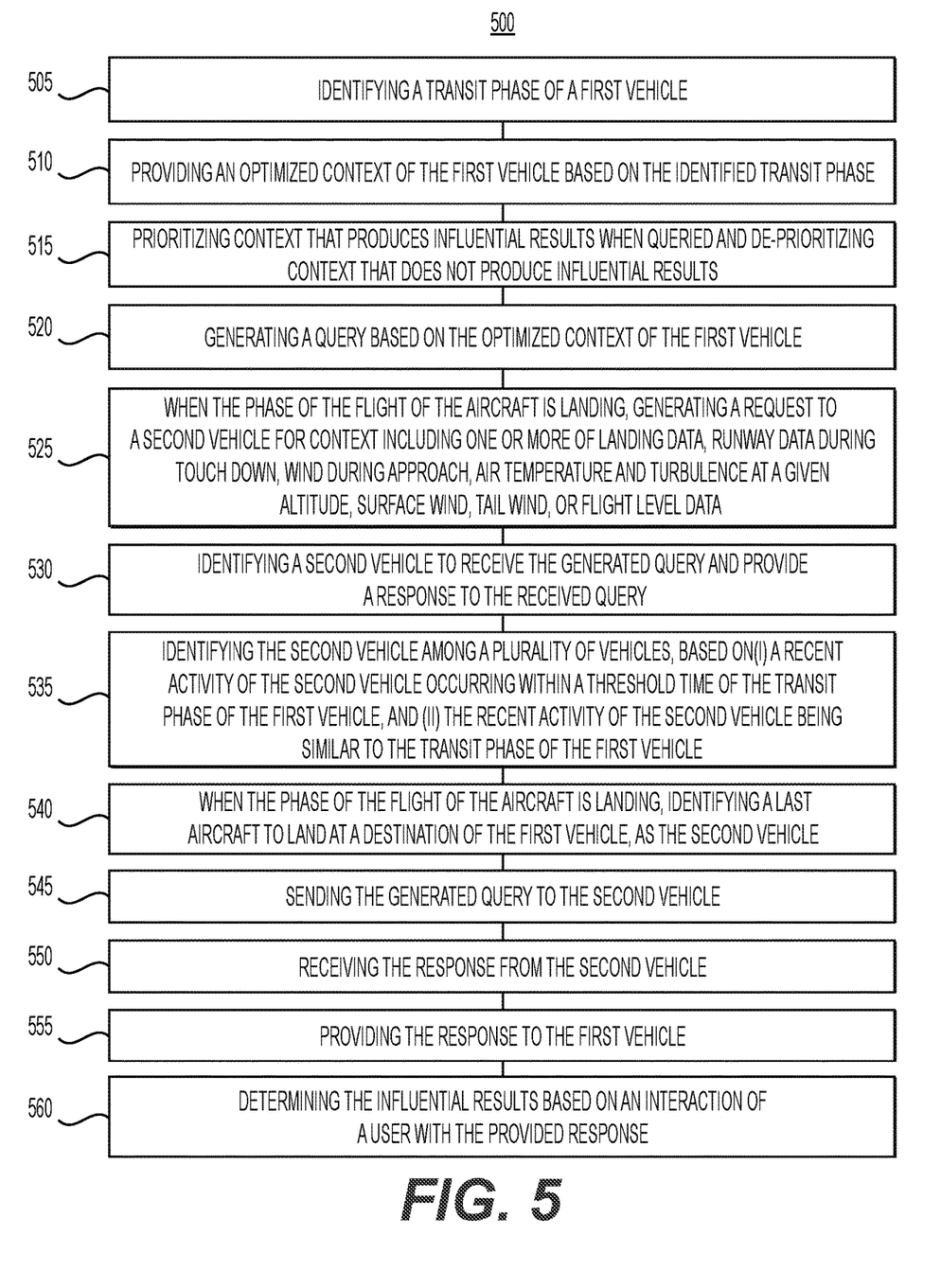
FIG. 5 depicts a flowchart of a method to operate a context-based optimal data exchange broker, according to one or more embodiments.

FIG. 5 depicts a flowchart of a method 500 to operate a context-based optimal data exchange broker, according to one or more embodiments. Method 500 may be implemented by controller 300, and may include various operations.

Method 500 may include identifying a transit phase of a first vehicle (operation 505). For example, the first vehicle may be an aircraft, and the transit phase of the first vehicle may be a phase of a flight of the aircraft. To further the example, the phase of the flight of the aircraft may be a pre-flight taxi, takeoff, climb, cruise, descent, approach, landing, or post-flight taxi. Method 500 may include providing an optimized context of the first vehicle based on the identified transit phase (operation 510). In operation 510, the providing the optimized context may include prioritizing context that produces influential results when queried and de-prioritizing context that does not produce influential results (operation 515).

Method 500 may include generating a query based on the optimized context of the first vehicle (operation 520). For example, when the phase of the flight of the aircraft is landing, the generating the query may include generating a request to the second vehicle for context including one or more of landing data, runway data during touch down, wind during approach, air temperature and turbulence at a given altitude, surface wind, tail wind, or flight level data (operation 525).

Method 500 may include identifying a second vehicle to receive the generated query and provide a response to the received query (operation 530). In operation 530, the identifying the second vehicle may include identifying the second vehicle among a plurality of vehicles, based on (i) a recent activity of the second vehicle occurring within a threshold time of the transit phase of the first vehicle, and (ii) the recent activity of the second vehicle being similar to the transit phase of the first vehicle (operation 535). For example, when the phase of the flight of the aircraft is landing, the identifying the second vehicle in operation 530 may include identifying a last aircraft to land at a destination of the first vehicle, as the second vehicle (operation 540). Method 500 may include sending the generated query to the second vehicle (operation 545), receiving the response from the second vehicle (operation 550), providing the response to the first vehicle (operation 555), and determining the influential results based on an interaction of a user with the provided response (operation 560).

Various embodiments of the present disclosure may continuously monitor for a predefined set of scenarios in order to identify the best course of action and parameters to optimize the predicted flight pattern. For example, the scenarios may be an operation state of a vehicle, such as a transit phase. Various embodiments of the present disclosure may use contextual querying from multiple flying vehicles in order to obtain environment and airspace data that are likely to be encountered by the current vehicle. Various embodiments of the present disclosure may improve exploitation of the connected framework. Various embodiments of the present disclosure may mitigate loss of fuel, reduced performance, and untimely maintenance setbacks, and may improve passenger experience.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for context-based data exchange, the system comprising:
a context-based querying model to generate a query based on an optimized context of a first vehicle, and to identify a second vehicle to receive the generated query and provide a response to the received query;
an adaptive context optimizer to receive a transit phase of the first vehicle and provide the optimized context by prioritizing context that produces influential results when queried and de-prioritizing context that does not produce influential results, based on the received transit phase; and
a service provider to identify the transit phase of the first vehicle, provide the identified transit phase to the adaptive context optimizer, receive the optimized context from the adaptive context optimizer, send the optimized context to the context-based querying model, and receive the generated query and identified second vehicle from the context-based querying model.

2. The system of claim 1, wherein the context-based querying model is further configured to identify the second vehicle among a plurality of vehicles, based on (i) a recent activity of the second vehicle occurring within a threshold time of the transit phase of the first vehicle, and (ii) the recent activity of the second vehicle being similar to the transit phase of the first vehicle.

3. The system of claim 1, wherein the first vehicle is an aircraft, and the transit phase of the first vehicle is a phase of a flight of the aircraft.

4. The system of claim 3, wherein the phase of the flight of the aircraft is a pre-flight taxi, takeoff, climb, cruise, descent, approach, landing, or post-flight taxi.

5. The system of claim 4, wherein the context-based querying model is further configured to generate the query to include a request to the second vehicle for context including one or more of landing data, runway data during touch down, wind during approach, air temperature and turbulence at a given altitude, surface wind, tail wind, or flight level data, when the phase of the flight of the aircraft is landing.

6. The system of claim 4, wherein the context-based querying model is further configured to identify a last aircraft to land at a destination of the first vehicle, as the second vehicle, when the phase of the flight of the aircraft is landing.

7. The system of claim 1, wherein the service provider is further configured to receive the generated query and identified second vehicle from the context-based querying model, send the generated query to the second vehicle, receive the response from the second vehicle, provide the response to the first vehicle, and determine the influential results based on an interaction of a user with the provided response.

8. A controller-implemented method for context-based data exchange, the method comprising:
identifying a transit phase of a first vehicle;
providing an optimized context of the first vehicle by prioritizing context that produces influential results when queried and de-prioritizing context that does not produce influential results, based on the identified transit phase;
generating a query based on the optimized context of the first vehicle; and
identifying a second vehicle to receive the generated query and provide a response to the received query.

9. The method of claim 8, wherein the identifying the second vehicle includes identifying the second vehicle among a plurality of vehicles, based on (i) a recent activity of the second vehicle occurring within a threshold time of the transit phase of the first vehicle, and (ii) the recent activity of the second vehicle being similar to the transit phase of the first vehicle.

10. The method of claim 8, wherein the first vehicle is an aircraft, and the transit phase of the first vehicle is a phase of a flight of the aircraft.

11. The method of claim 10, wherein the phase of the flight of the aircraft is a pre-flight taxi, takeoff, climb, cruise, descent, approach, landing, or post-flight taxi.

12. The method of claim 11, wherein when the phase of the flight of the aircraft is landing, the generating the query includes generating a request to the second vehicle for context including one or more of landing data, runway data during touch down, wind during approach, air temperature and turbulence at a given altitude, surface wind, tail wind, or flight level data.

13. The method of claim 11, wherein when the phase of the flight of the aircraft is landing, the identifying the second vehicle includes identifying a last aircraft to land at a destination of the first vehicle, as the second vehicle.

14. The method of claim 8, further comprising:
sending the generated query to the second vehicle;
receiving the response from the second vehicle;
providing the response to the first vehicle; and
determining the influential results based on an interaction of a user with the provided response.

15. A non-transitory computer-readable medium storing instructions that, when executed by one or more processors, cause the one or more processors to perform operations for context-based data exchange, the operations comprising:
identifying a transit phase of a first vehicle;
providing an optimized context of the first vehicle by prioritizing context that produces influential results when queried and de-prioritizing context that does not produce influential results, based on the identified transit phase;
generating a query based on the optimized context of the first vehicle; and
identifying a second vehicle to receive the generated query and provide a response to the received query.

16. The computer-readable medium of claim 15, wherein the identifying the second vehicle includes identifying the second vehicle among a plurality of vehicles, based on (i) a recent activity of the second vehicle occurring within a threshold time of the transit phase of the first vehicle, and (ii) the recent activity of the second vehicle being similar to the transit phase of the first vehicle.

17. The computer-readable medium of claim 7, wherein the operations further comprise:
sending the generated query to the second vehicle;
receiving the response from the second vehicle;
providing the response to the first vehicle; and
determining the influential results based on an interaction of a user with the provided response.

* * * * *